United States Patent [19]
Kingsolver

[11] Patent Number: 5,823,666
[45] Date of Patent: Oct. 20, 1998

[54] STEERING WHEEL MOUNTED TURN SIGNAL CONTROLS AND INDICATORS

[76] Inventor: George L. Kingsolver, 8401 Pan Am Freeway 72 N.E., Albuquerque, N. Mex. 87113

[21] Appl. No.: 951,728

[22] Filed: Oct. 16, 1997

[51] Int. Cl.⁶ .................................................. B60Q 1/26
[52] U.S. Cl. ..................... 362/488; 362/540; 200/61.54; 340/475; 340/496
[58] Field of Search ............... 362/61, 80, 83.3, 362/540, 488; 200/61.27, 61.54; 340/475, 476

[56] References Cited

U.S. PATENT DOCUMENTS

| | | | |
|---|---|---|---|
| D. 256,575 | 8/1980 | Moore | D12/174 |
| D. 276,037 | 10/1984 | Montgomery | D12/177 |
| D. 276,038 | 10/1984 | Montgomery | D12/177 |
| 1,996,416 | 4/1935 | Haines | 200/61.27 |
| 2,578,423 | 12/1951 | Harstine | 200/61.27 |
| 4,426,951 | 1/1984 | Nishizima | 116/46 |
| 5,438,314 | 8/1995 | Evans | 200/61.27 |
| 5,469,338 | 11/1995 | Sims | 362/61 |
| 5,576,524 | 11/1996 | Strom et al. | 200/61.27 |

*Primary Examiner*—Stephen F. Husar
*Attorney, Agent, or Firm*—David L. Volk

[57] ABSTRACT

A push button type left turn signal switch and a push button type right turn signal switch are each mounted on a vehicle steering wheel. The push button type left turn signal switch is wired in parallel with a lever activated left turn signal switch, and the push button type right turn signal switch is wired in parallel with a lever activated right turn signal switch. The push button type left turn signal switch includes a left switch lamp for illuminating the push button type left turn signal switch. The push button type right turn signal switch includes a right switch lamp for illuminating the push button type right turn signal switch. The left switch lamp is wired in series with the push button type left turn signal switch and the lever activated left turn signal switch. The right switch lamp is wired in series with the push button type right turn signal switch and the lever activated right turn signal switch.

1 Claim, 3 Drawing Sheets

STEERING WHEEL MOUNTED TURN SIGNAL CONTROLS AND INDICATORS

BACKGROUND OF THE INVENTION

1. Field of the Invention

The present invention relates to turn signal controls and indicators.

2. Description of the Related Art

When signaling a lane change using a conventional turn signal control lever, a driver must remove one hand from the steering wheel in order to manipulate the lever. If the driver moves the lever to the first, unlocked position, he or she must continue to hold the lever in that position until the lane change is completed, at which time, releasing the lever will turn the signal off.

If the driver moves the lever to the second, locked position, and if the amount of return rotation of the steering wheel is not sufficient to turn the signal off, he or she must remember to manually return the lever to the off position, or the signal will remain blinking, even after the lane change has been completed.

U.S. Pat.No. 5,469,338 to Sims shows turn signal switches mounted to a steering wheel. When the left switch is depressed, the left turn signal will flash. When the left switch is released, the left turn signal will go off. The right switch works in a similar manner to control the right turn signal.

The invention of Sims solves the aforementioned problems by permitting a driver's hands to stay on the wheel while pressing the switches, and by only turning the respective signal off when the respective switch has been released.

An additional problem of the prior art, which Sims does not solve, is that the conventional dashboard turn signal indicators, which indicate to a driver that a turn signal is on, are not readily noticeable to the driver. The size and placement of the dashboard turn signal indicators behind the viewing window of the dashboard contributes to this problem.

What is needed is a pair of steering wheel mounted turn signal switches which operate in parallel with the conventional lever turn signal control, and which illuminate in a flashing manner whenever the turn signals are flashing. This illumination of the steering wheel mounted turn signal switches should occur regardless of whether the lever turn signal control or the steering wheel mounted switches are used to energize the turn signals. Such an invention would permit a driver to keep both hands on the steering wheel when signaling a lane change, while simultaneously making the driver more aware of whether or not his or her turn signals have been activated.

SUMMARY OF THE INVENTION

The turn signal control and indication system of the present invention includes a push button type left turn signal switch and a push button type right turn signal switch, each mounted on a vehicle steering wheel. The push button type left turn signal switch is wired in parallel with a lever activated left turn signal switch, and the push button type right turn signal switch is wired in parallel with a lever activated right turn signal s witch.

The push button type left turn signal switch energizes the left turn signal lights when the push button type left turn signal switch is depressed, and de-energizes the left turn signal lights when the push button type left turn signal switch is released. The push button type right turn signal switch energizes the right turn signal lights when the push button type right turn signal switch is depressed, and de-energizes the right turn signal lights when the push button type right turn signal switch is released.

The push button type left turn signal switch includes a left switch illuminating means for illuminating the push button type left turn signal switch. The push button type right turn signal switch includes a right switch illuminating means for illuminating the push button type right turn signal switch. The left switch illuminating means is wired in series with the push button type left turn signal switch and the lever activated left turn signal switch. The right switch illuminating means is wired in series with the push button type right turn signal switch and the lever activated right turn signal switch.

Because the push button type turn signal switches are mounted on the vehicle steering wheel, a driver does not have to remove his or her hands from the wheel to signal a lane change.

Because the push button type turn signal switches are wired in parallel with the lever activated turn signal switches, the driver may choose to signal using the push buttons or the lever activated switches, at his or her discretion. For example, when making a 90 degree turn, the lever activated switches, which are opened when the steering wheel rotates back toward its original position, are appropriate to use.

When making a lane change, the push button type switches, which must be released to de-energize the turn signals, are more appropriate. In such a case, the amount of return travel of the wheel is usually not sufficient to open the conventional lever activated switches.

Because the push button type turn signal switches, which are mounted on a steering wheel, illuminate when the turn signals are activated, a driver is more aware of the operation of the turn signals.

Still further features and advantages will become apparent from the ensuing description and drawings.

DETAILED DESCRIPTION

Figure 1:
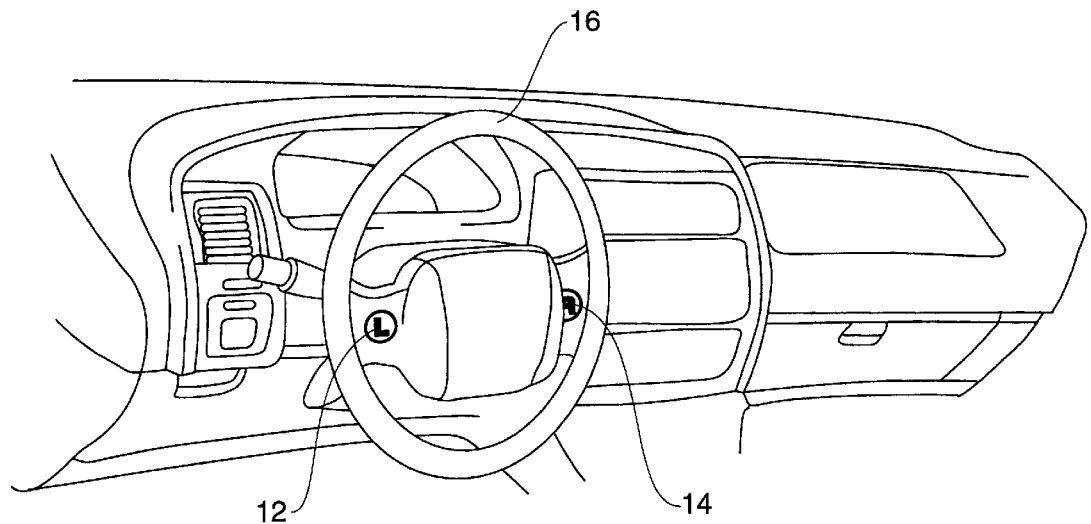
FIG. 1 is a perspective view of a push button type left turn signal switch and a push button type right turn signal switch, each mounted on a vehicle steering wheel.
Figure 2:
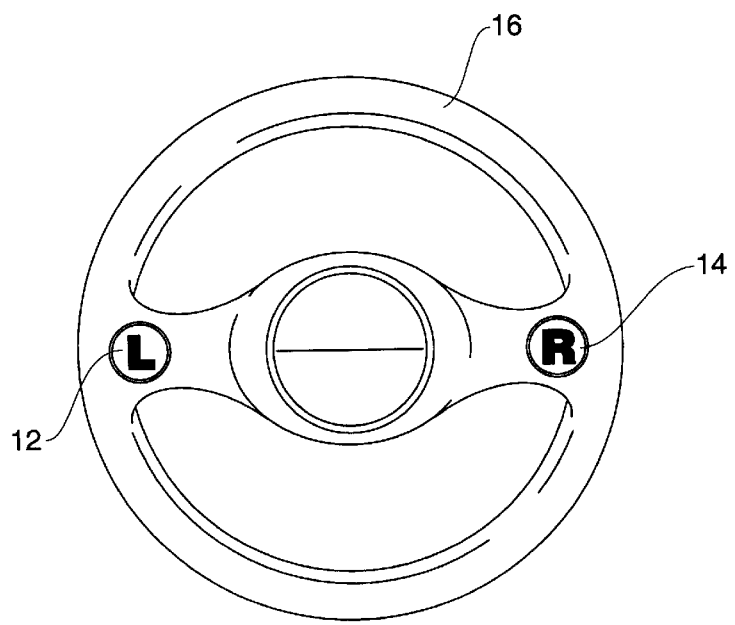
FIG. 2 is an elevational view of the vehicle steering wheel.
Figure 2A:
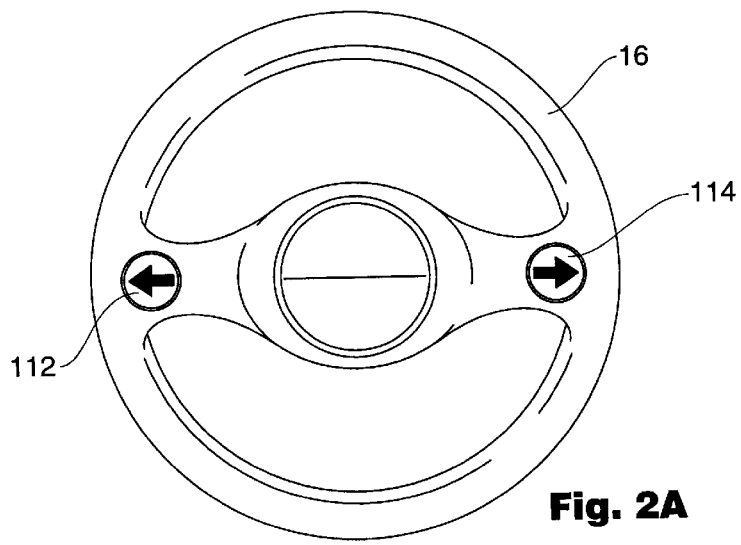
FIG. 2A is an elevational view of the steering wheel, showing a second embodiment of the push button type left and right turn signal switches.

FIG. 1 is a perspective view of a push button type left turn signal switch 12 and a push button type right turn signal switch 14, each mounted on a vehicle steering wheel 16. FIG. 2 is an elevational view of the vehicle steering wheel 16. Referring to FIGS. 1 and 2, the push button type left and right turn signal switches 12, 14 are marked respectively with the characters "L" and "R" to indicate which turn signals they control. FIG. 2A is an elevational view of the steering wheel 16, showing a second embodiment of the push button type left and right turn signal switches 112, 114, wherein the character "L" is replaced by a left-pointing arrow, and the character "R" is replaced by a right-pointing arrow. In all other respects, the second embodiment is the same as the first embodiment.

Figure 3:
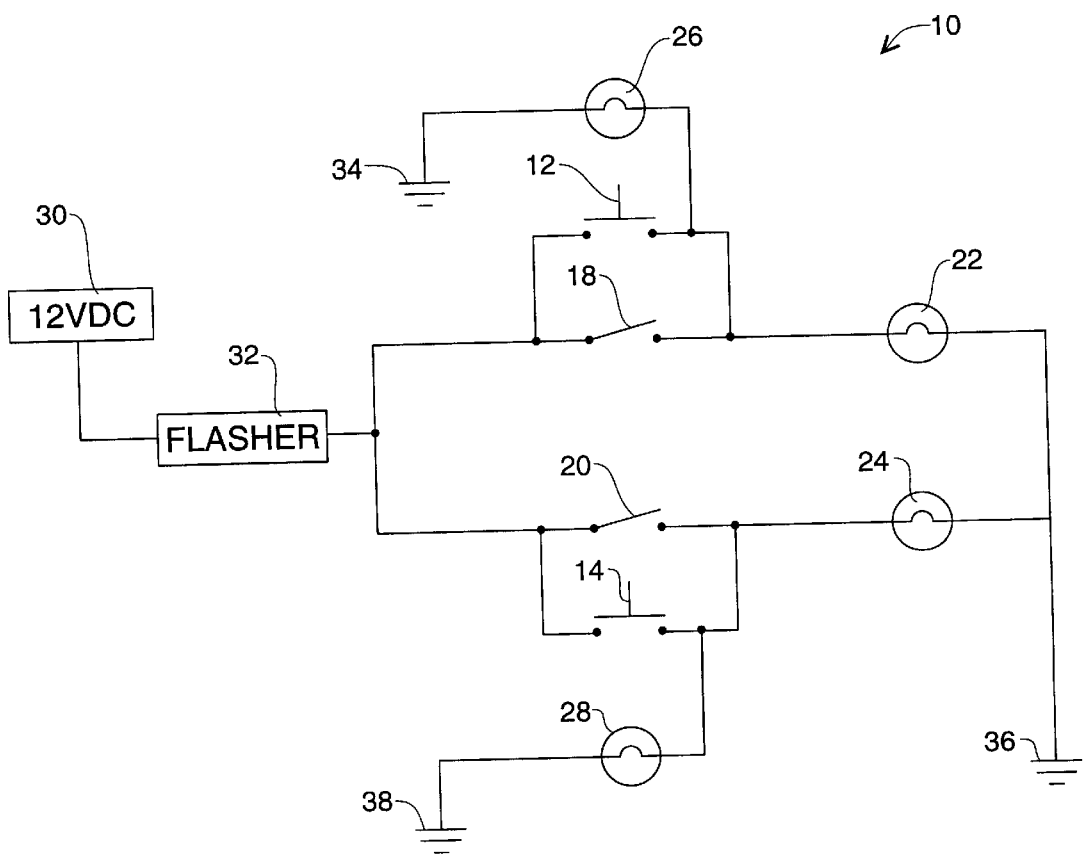
FIG. 3 is a schematic diagram of the turn signal control and indication system of the present invention.

FIG. 3 is a schematic diagram of the turn signal control and indication system 10 of the present invention. The push button type left turn signal switch 12 is wired in parallel with a lever activated left turn signal switch 18, and the push button type right turn signal switch 14 is wired in parallel with a lever activated right turn signal switch 20.

The lever activated turn signal switches 18, 20 and the push button type turn signal switches 12, 14 are wired in series with a power source or battery 30, and conventional flasher circuitry 32.

The push button type left turn signal switch 12 is configured to energize the left turn signal lights 22 of the vehicle (not shown) when the push button type left turn signal switch 12 is depressed, and to de-energize the left turn signal lights 22 when the push button type left turn signal switch 12 is released.

The push button type right turn signal switch 14 is configured to energize the right turn signal lights 24 of the vehicle when the push button type right turn signal switch 14 is depressed, and to de-energize the right turn signal lights 24 when the push button type right turn signal switch 14 is released.

The push button type left turn signal switch 12 includes a left switch illuminating means 26 for illuminating the push button type left turn signal switch 12. The push button type right turn signal switch 14 includes a right switch illuminating means 28 for illuminating the push button type right turn signal switch 14.

The illuminating means 26, 28 may be any conventional structure such as a lamp or light emitting diode, which may be housed behind a translucent or transparent face of the push button type turn signal switch 12, 14, or which may be configured to shine upon the push button type turn signal switch 12, 14 from a point external to the push button type turn signal switch 12, 14. Because such manners of implementing the illumination means 26, 28 are well known in the art, no further disclosure of same is necessary.

The left switch illuminating means 26 is wired in series with the push button type left turn signal switch 12 and the lever activated left turn signal switch 18. The right switch illuminating means 28 is wired in series with the push button type right turn signal switch 14 and the lever activated right turn signal switch 20 The circuit is connected conventionally to ground 34, 36, 38.

Figure 4:
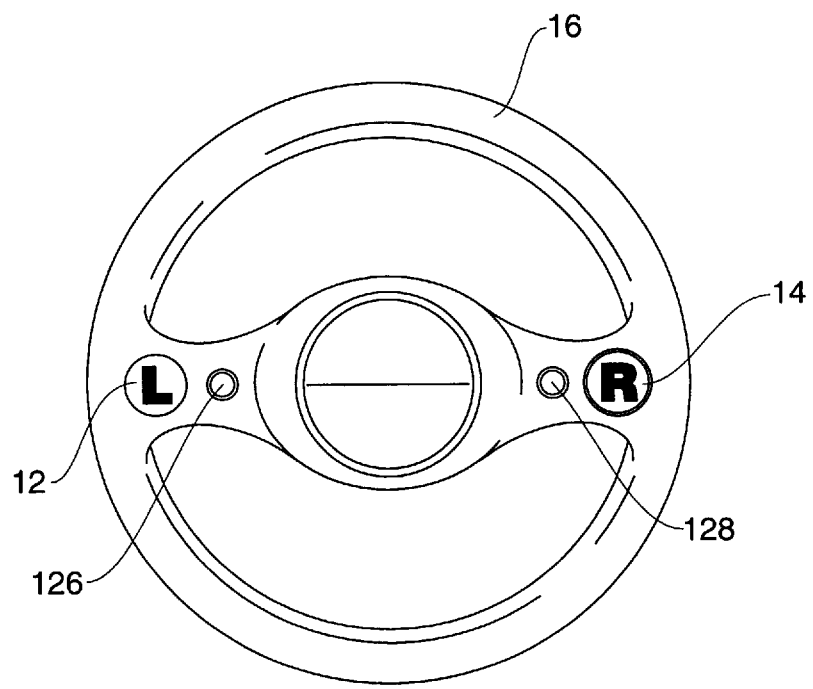
FIG. 4 is an elevational view of the steering wheel, showing another embodiment of the present invention.

FIG. 4 is an elevational view of the steering wheel 16, showing another embodiment in which the left and right switch illuminating means 26, 28 are replaced by left and right indicating means 126, 128, mounted on the steering wheel 16 separately from the push button type turn signal switches 12, 14. The left and right indicating means 126, 128 serve a similar function to the switch illuminating means 26, 28, which is to notify the driver in a very apparent manner that the turn signal lights 22, 24 are energized. The left and right indicating means 126, 128 would take the place of the left and right switch illumination means 26, 28 in FIG. 3.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A turn signal control and indication system comprising:
  a. a push button type left turn signal switch and a push button type right turn signal switch;
  b. the push button type left turn signal switch and the push button type right turn signal switch each adapted to mount on a vehicle steering wheel;
  c. the push button type left turn signal switch adapted to be wired in parallel with a lever activated left turn signal switch;
  d. the push button type right turn signal switch adapted to be wired in parallel with a lever activated right turn signal switch;
  e. the push button type left turn signal switch adapted to energize a set of left turn signal lights when the push button type left turn signal switch is depressed, and to de-energize the set of left turn signal lights when the push button type left turn signal switch is released;
  f. the push button type right turn signal switch adapted to energize a set of right turn signal lights when the push button type right turn signal switch is depressed, and to de-energize the set of right turn signal lights when the push button type right turn signal switch is released;
  g. the push button type left turn signal switch including a left switch illumination means for illuminating the push button type left turn signal switch;
  h. the push button type right turn signal switch including a right switch illumination means for illuminating the push button type right turn signal switch;
  i. the left switch illumination means wired in series with the push button type left turn signal switch and the lever activated left turn signal switch; and
  j. the right switch illumination means wired in series with the push button type right turn signal switch and the lever activated right turn signal switch;
  k. whereby the left switch illumination means will illuminate when the push button type left turn signal switch is depressed and will also illuminate when the lever activated left turn signal switch is closed, and the right switch illumination means will illuminate when the push button type right turn signal switch is depressed and will also illuminate when the lever activated right turn signal switch is closed.

* * * * *